United States Patent Office 3,373,871
Patented Mar. 19, 1968

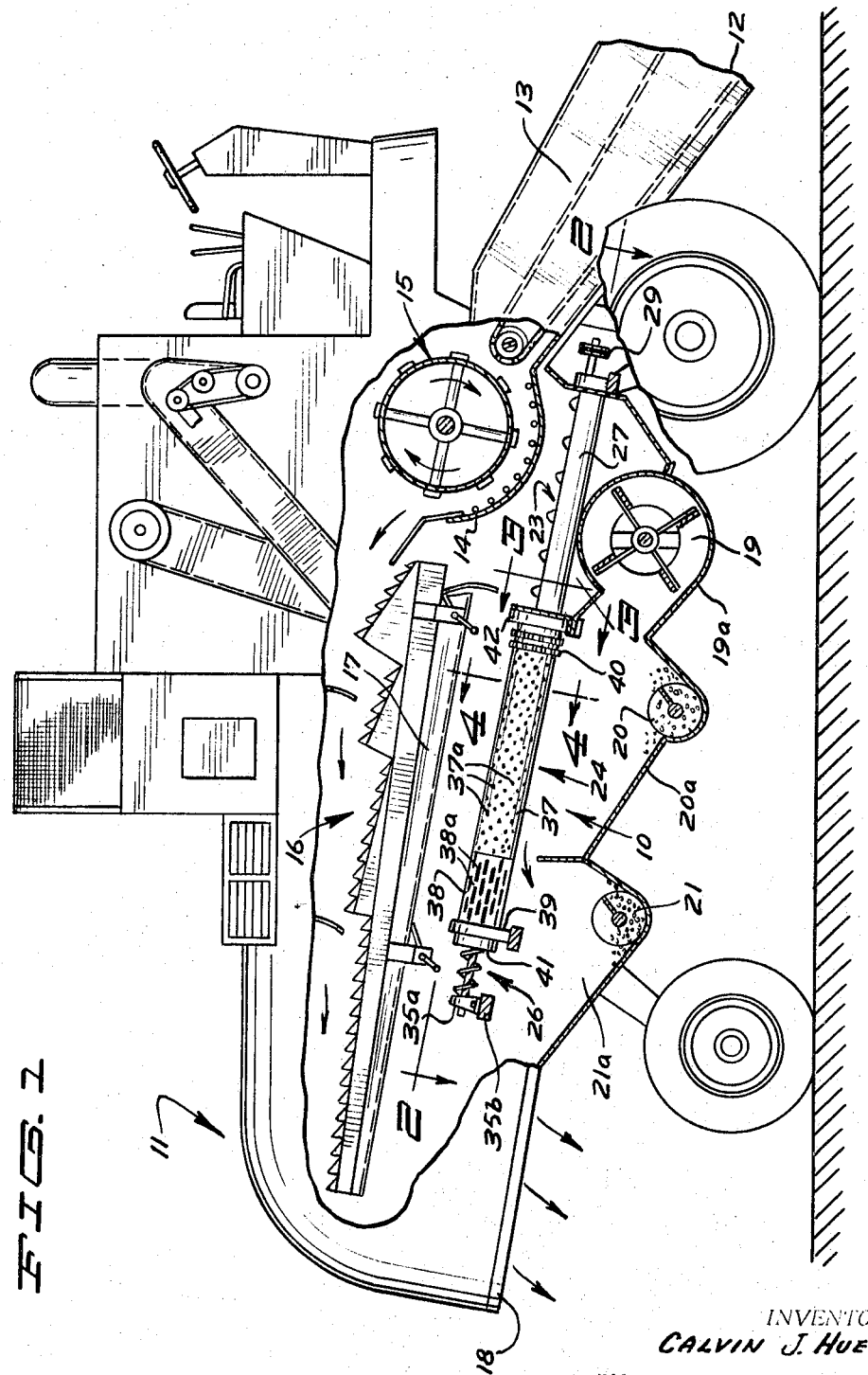

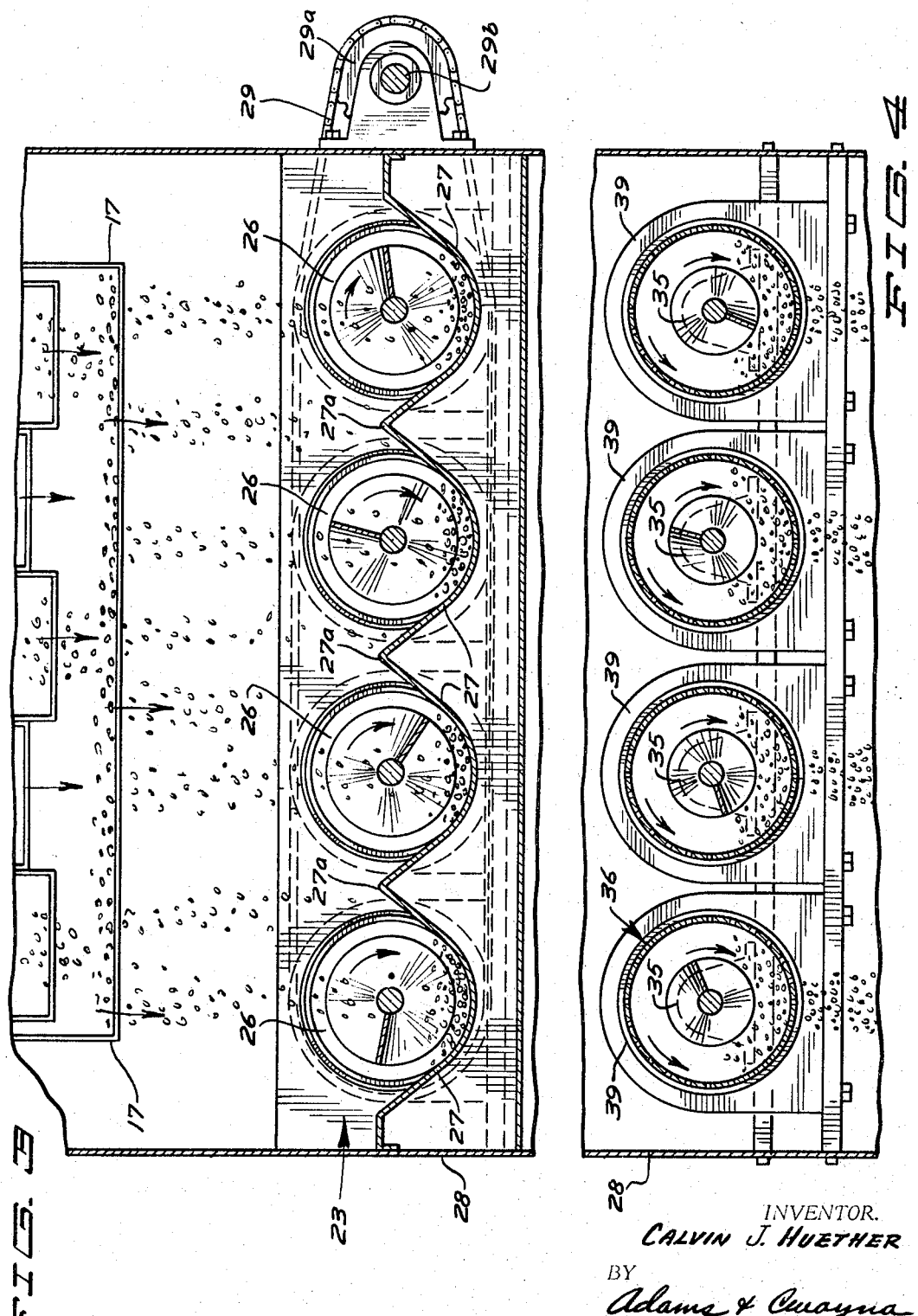

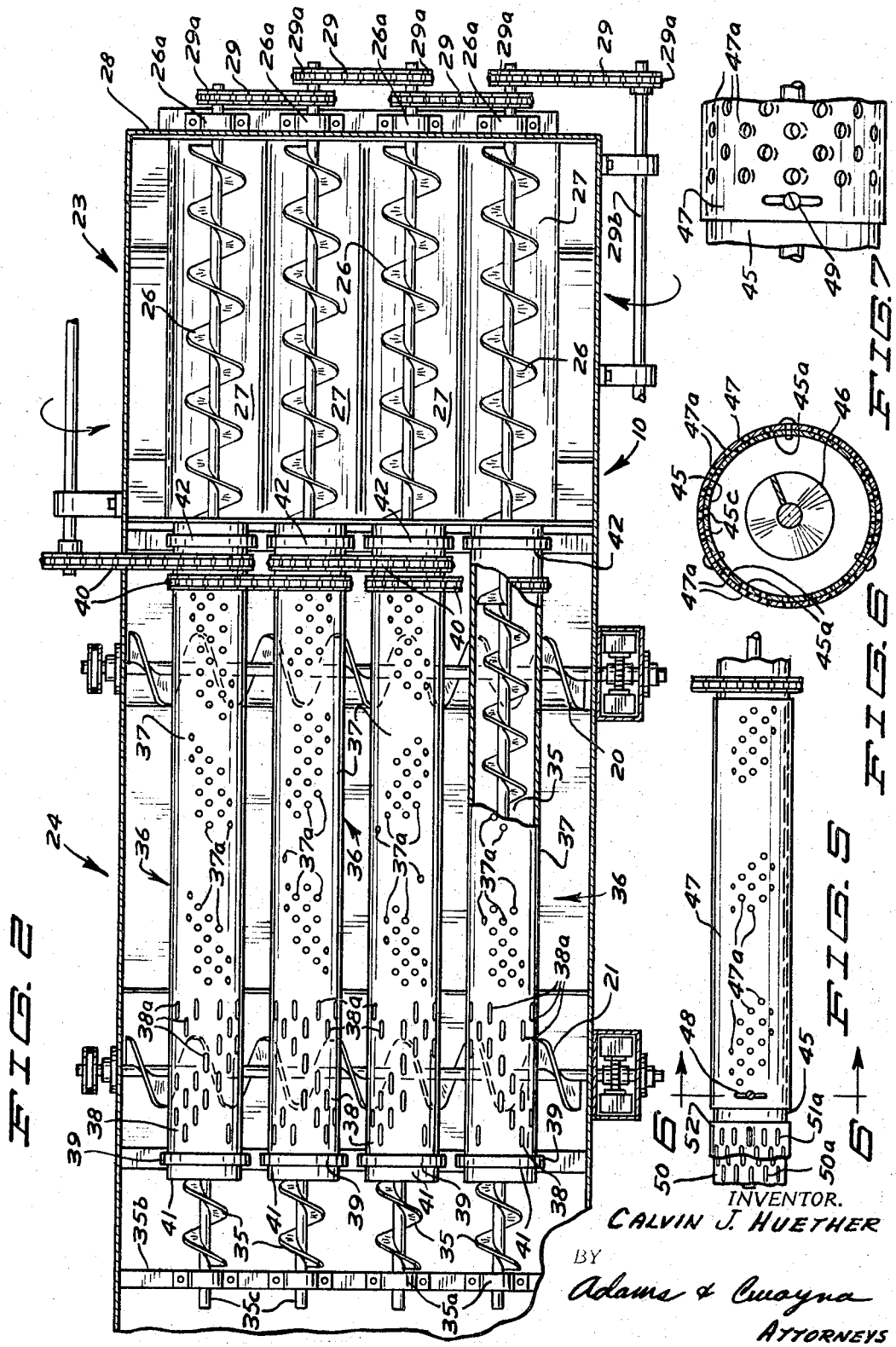

3,373,871
SEPARATING SIEVES FOR COMBINES
Calvin J. Huether, Regent, N. Dak. 58650
Filed Apr. 7, 1965, Ser. No. 446,240
10 Claims. (Cl. 209—284)

ABSTRACT OF THE DISCLOSURE

This invention relates to a separating device for installation in agricultural combines designed to specifically replace the flat separating sieves now utilized in such machines. The separating sieve structure as provided herein includes a first grain receiving section designed to initially receive a partially separated grain therein and which includes a plurality of drive auger members to displace this received grain in a separating sieve section. A plurality of individual open-topped auger housing compartments are provided such that a certain amount of the grain received therein will be a portion to each auger and will not tend to collect on one side of the device if the device should, for example, be operating on an incline. The received grain is delivered by the augers to aligned separating conduits which conduits are provided with a plurality of passages extending radially therethrough and which include a first set of passages and a second set of passages of substantially different sizes. The conduits are rotated in counter rotation to the augers and a working effect is produced on the grain such that further separation is afforded and the completely threshed grain is delivered to the first set of passages and the partially separated grain is delivered through the second set of passages where it will be returned to the initial grain receiving section for rethreshing.

---

Generally the purpose of a combine is to cut grain as it is propelled across a field and to feed this grain into a separating unit which initially separates the straw from the grain and which further separates the grain particles from the hulls normally incasing the grain particles. The separated grain is of course delivered to a storage system and the straw and other waste products are expelled from the machine back onto the field.

In present day construction, the final separation of the grain from the chaff and hulls is obtained by providing a substantially rectangular shaped flat sieve through which is fed a blast of high pressure air such that the light-weight chaff is carried from the grain while the grain, being substantially heavier than the chaff, will pass through the sieve and into a grain storage area. Various problems have existed due to the use of the rectangular flat sieve and it is a prime interest of this application to provide a sieve arrangement which will eliminate the majority of these problems.

One definite problem arises when the ordinary combine is operated on a position other than level such as a side hill. The problem here is that the grain and waste will tend to bunch on one side of the flat sieve thus slowing down the separating process. Another problem is the loss of grain due to the static condition of the flat sieve in that the flat sieve arrangement does not allow for any additional separating action and in order to thoroughly thrash the grain, the unseparated portions must be returned and run through the machine several times.

The object of this invention is to provide a plurality of substantially cylindrical rotating sieves which will impart a rotating and thus a separating action to the grain particles and which further is provided with positive drive mechanism adjacent the sieves such that a larger quantity of material may be driven through the sieves in any period of time as compared with the flat sieve. Further by providing a plurality of individual separating sieves the grain will not tend to bunch on any side of the machine when the machine is not on level ground but will be disbursed substantially evenly throughout the machine thus increasing the efficiency of the machine.

The use of cylindrical sieves substantially increases the area of the sieves which is exposed to the separating air blast which in turn increases the speed of chaff removal from the grain.

It is an object of applicant's invention to provide a cylindrical separating sieve structure for combines and the like to increase the available sieve and separating area of a combine.

It is another object of applicant's invention to provide a positive drive mechanism operating in relation to the separating sieve structure of a combine to positively feed material to be separated therethrough whereby the speed of separation may be substantially increased.

It is a further object of applicant's invention to provide a plurality of cylindrical separating sieves arranged to cover the transverse width of a combine with means therebetween to prevent sliding of the material being separated to one side of the machine should the machine be operated in a position other than level.

It is a further object of applicant's invention to provide a plurality of grain separating sieves having an adjustable separating feature wherein the sizes of the separate apertures therethrough may be varied such that the units may be used for separating grains and materials of various sizes.

These and other objects and advantages of my invention will more fully appear from the following description made in connection with the accompanying drawings, wherein like reference characters refer to the same or similar parts throughout the several views, and in which:

FIG. 1 is a schematic side elevation of a combine showing the internal arrangement of portions thereof with the separating sieves of this invention in their proper operating position;

FIG. 2 is a substantially horizontal cross section taken along line 2—2 of FIG. 1;

FIG. 3 is a section taken substantially along line 3—3 of FIG. 1;

FIG. 4 is a section view taken substantially along line 4—4 of FIG. 1 illustrating another longitudinal location of the separating device of this invention;

FIG. 5 is a modified form of the invention showing the adjustment feature thereof;

FIG. 6 is a section taken substantially along line 6—6 of FIG. 5;

FIG. 7 illustrates a portion of FIG. 5 drawn to an enlarged scale.

In accordance with the accompanying drawings, the complete separating sieve of this invention is generally designated 10 and is illustrated in operative position within a combine 11. The general structure of a combine is well-known and the following general description of a combine is given for purposes of further explanation of this invention.

Combine 11 is of course a wheeled structure with means for transporting the same through a field of grain to be harvested and the grain receiving end is designated 12. Grain is cut and delivered upwardly through a feeder conveyor 13 into a first concave 14 which is provided with a rotating thrashing rub-bar cylinder generally designated 15. It is at this point that the initial separation of the grain is made and the concave is perforate to permit grain to pass therethrough after this first separation. Straw and grain remaining unseparated after this operation are fed rearwardly of the machine on a plurality of straw walkers generally designated 16 which, as is commonly known, operate on a crank action to displace the straw rearwardly to the straw discharge end 18 of the thrasher 11. As the straw is carried by the walker 16 further separation of the grain takes place and this grain is fed rearwardly to the separating sieve structure through a grain pan 17 such that it will be carried along with the grain falling through the concave 14 for the final separating procedure.

Sieve structure 10 of this invention is designed to replace the ordinarily flat separating sieve structure and is positioned in the same relative position as a flat sieve would be as shown in FIG. 1. Below the sieve structure 10 a fan member 19 is provided which will aid in blowing the chaff and other foreign materials from the thrashed grain. Fan 19 is contained in a housing unit 19a which directs the air into and upwardly through the sieve area.

A first clean grain auger 20 and clean grain section 20a is provided to receive the thoroughly thrashed grain and this grain is directed laterally out of the thrasher into storage bins which may be and are often carried by the combine.

A second return grain auger 21 and return grain housing 21a is provided in rearwardly spaced relation from the clean grain portion 20a where the partially separated grain is received and is driven by the auger 21 laterally from the unit and is returned to the concave 14 through a longitudinal shoot (not shown) such that it may again go through the thrashing cycle. In this return procedure grain which was not thoroughly thrashed is recycled such that there will be no loss of grain. Air, moving from the fan 19 aids separation of the grain from the chaff and this chaff, being lighter than grain, is blown thereby out of the discharge outlet 18.

Sieve unit 10 as provided in this invention consists of an unseparated grain receiving section 23 and is mounted generally below the concave 14 to receive and propel the grain from this receiving section 23 through a next adjacent separating section 24. The entire sieve unit 10 is built into the combine 11 with appropriate supports for mounting the same to the frame of the combine 11. The actual separating section 24 is best illustrated in the plan view shown in FIG. 2 and the section shown in FIG. 3. Receiving section 23 includes a plurality of auger members 26 arranged in generally side-by-side parallel relation and a plurality of auger housing members designated 27 which are illustrated in cross section in FIG. 3. Housing members 27 comprise a generally U-shaped member having connecting crown portions 27a therebetween such that all of the grain dropping thereon from the concave 14 and return grain pan 17 will be directed into one of said U-shaped housings 27. As seen in FIG. 3, each of the augers 26 rotates within one of the housings and is mounted for this rotation through bearing members 26a on one end thereof mounted on a frame portion 28. Augers 26 are simultaneously driven through a one-directional drive system consisting of drive chains 29 and sprocket systems 29a. Power for this drive may be supplied to a drive shaft 29b through a power take off or a self-driven unit attached to shaft 29b.

This arrangement of augers 26 and U-shaped housings 27 will not permit the grain to accumulate on one side of the delivery section 23 which often happens in present structures when the combine is operating on a side hill or other slanted surface.

As illustrated in FIGS. 1 and 2 the separating section 24 is in grain receiving relation to receiving section 23 and the augers 26 extend into and pass through the receiving sections 24. The augers 26 in this separating section 24 are designated 35 and in the form shown are of substantially smaller diameter than the auger portion 26 in the receiving section 23. Bearings 35a which are mounted on a frame portion 35b attached to the combine receive the ends of the augers for rotation.

Grain separator section 24 also includes, in the form shown, a plurality of tubular sieve members 36 each sieve member comprising what may be termed a fine separating section 37 and a coarse separating section 38. Fine separating section 37 is cylindrical in shape and completely surrounds auger 35 and the coarse separating section 38 is longitudinally aligned with fine section 37 around auger 35. The fine 37 and coarse 38 sections comprise substantially cylindrical units extending longitudinally of the auger 35 having a plurality of separating apertures 37a and 38a therethrough to permit either the fully separated grain to pass through apertures 37a into the separated grain auger 20 where the same may be delivered to a completely threshed discharge unit or permits the partially separated grain to pass through aperture 38a into return auger 21. These apertures 38a are particularly larger to permit the white heads and grain halfs which are relatively larger than the completely threshed grain particles to pass therethrough to be returned for an additional thrashing operation.

In the form shown, particularly in FIG. 2 each separating sieve 36 comprises a singular conduit section of constant diameter wherein the fine 37 and coarse 38 sections are longitudinally joined in a single unit. A bearing 39 is arranged to rotatively carry one end of each sieve 36 with the other end being driven in counter relation to the augers 35 through a chain drive and sprocket system 40. The drive end of the sieves is likewise mounted in bearings 42.

In the manner described each of the separating sieves 36 rotates in counter relation to the augers 35. The reason for this counter relation is that as the augers tend to drive the grain, the separating sieves 36 tend to shift the grain which, therefore, results in a multiple separating action which speeds the effectiveness of the separating action for the grain.

It would be possible for the grain to be driven upwardly along the separating unit without the inclusion of the auger element in that any material carried in a slanting container tends to rise in the container as the container is rotated. The auger device however insures the transportation of the grain from the receiving end to the discharge end and sufficiently works the grain to insure positive separation thereof from the covering elements.

The auger portion 35 passing longitudinally through the sieves 36 is illustrated as being substantially reduced in size from that auger portion 26 in the receiving section 23. Through experimentation it has been found that the ideal auger size with respect to the sieves is approximately 1/3 to 1/2 of the sieve diameter. The tendency of material to climb the walls of a rotating container permits the use of a smaller auger and the auger in effect serves as an element to assist in working the grains to aid in separation in addition to propelling the grain through the sieves 36.

The discharge end 41 of the sieves 36 is open to permit discharge of the chaff, white heads, and straw into the discharge portion 18 of the combine.

The operation of this preferred form unit then is that the initially separated grain will be received into the receiving area 23 from the thrashing cylinder 15 and grain pan 17 where it will be moved by auger 26 into the separating section 24. To permit this movement the sieves 36 must naturally be aligned with the U-shaped housings 27. Within the separating section the augers 35 of substantially smaller diameter than sieves 36 in addition to the counteraction of the sieves 36 and augers 35 tend to efficiently work the grain to insure complete separation thereof and wherein the thoroughly separated grain will pass through the separating holes 37a in the periphery of the cylinder 37. That grain which does not easily separate is driven forwardly by augers 35 into the coarse separating section 38 wherein the sieve apertures being substantially larger will permit unseparated particles to pass therethrough into the return-grain auger 21 for final return to receiving area 23 for rethrashing thereof. During the working and separating action air, of course, is being forced upwardly through the sieves 36 from fan 19 and this moving air naturally aids the separating action by blowing the lighter than grain particles up and subsequently through the open end 41 of the sieves 36.

The slanted arrangement of the entire unit with respect to the combine aids in the separation of the grain from the chaff in that the flow through the separating device must be against the force of gravity and therefore there is not necessarily free flow but rather a slow-down flow which facilitates working of the grain to insure complete separation from the chaff.

Receiving section 23 of the unit and likewise the separating section 24 is divided into a plurality of units arranged side by side across the width of the combine to prevent bunching should the machine be working on a side hill or the like. The U-shaped housings 27 tend to evenly distribute the received material rather than permit the material to be shifted to the lower side of the unit.

A modified form of this invention is illustrated in FIGS. 5, 6 and 7 wherein a first conduit 45 is provided surrounding an auger 46 and wherein an adjustable cylinder 47 is provided in closely spaced relation to first conduit 45. In this form, holes 47a of the outer shell 47 are shiftable with respect to the holes in the inner initial separating cylinder 45. Shifting of the outer cylinder 45 with respect to the inner conduit 45 permits a change of cross section of the apertures through the unit such that when the apertures 37a–45a are radially aligned the effective opening will be of one size and when the outer shell 47 is shifted with respect to inner shell 45, the dimension of the effective openings will be substantially reduced. In this manner the size of the openings permitting the thrashed grain to pass therethrough may be governed with respect to the size of the grain being harvested.

The coarse end of the separating cylinder may likewise in this modified form be affixed with an outer 52 and inner 50 shell with the outer shell being provided with apertures 51a and the inner shell with apertures 50a. Again means such as the slot and screw device 49 are provided to permit shifting of the shells to govern the size of the effective passage.

This modified form then completely governs the size of the grain being classified as clean and the size of the grain being classified as unclean which size is, of course, determined by the particular grain being thrashed.

This adjustable feature could, of course, be obtained by providing a plurality of individual separating sieve members having two different sized apertures therealong which would correspond to apertures 37a–38a which would be usable with a certain sized particle of grain.

It should be obvious that applicant has provided a new and unique grain separating system for use with combines designed to replace the standard flat sieve separating section of combines to positively insure distribution of the grain being harvested along the transverse width of the combine and to positively insure the proper separation of the grain from the chaff due to the increased movement given the grain particles and which includes either an adjustable separating aperture or a device having interchangeable grain separating elements with each element provided with separating apertures designed in accordance with a particle grain.

It should be obvious this particular unit may be easily attached to fit on a now available combine or may be attached to fit on a combine being produced with the result and effect being an increased production with insurance of positive separation of the grain elements.

It will, of course, be understood that various changes may be made in the form, details, arrangements and proportion of parts without departing from the scope of my invention, which generally stated consists in the matter set forth in the appended claims.

What I claim is:
1. Apparatus for final separation of grains, in combination with a combine including:
   (a) a plurality of substantially cylindrical separating elements arranged transversely across the width of a combine, each having:
       (1) a portion thereof arranged in position within the combine to receive partially separated grain therein;
       (2) a conveying passage through the longitudinal length thereof from the receiving portion to a discharge portion;
       (3) a plurality of grain passages through the periphery thereof to permit separated grains to pass from the conveying passage;
   (b) means for conveying the partially separated grain through the separating elements and conveying the waste remaining to the discharge portion of the separating elements.
2. Apparatus for final separation of grains, in combination with a combine including:
   (a) a plurality of substantially cylindrical separating elements arranged transversely across the width of a combine, each having:
       (1) a portion thereof arranged in position within the combine to receive partially separated grain therein;
       (2) a conveying passage through the longitudinal length thereof from the receiving portion to a discharge portion;
       (3) a first plurality of grain passages through the periphery thereof extending longitudinally along said elements adjacent the receiving portion thereof;
       (4) a second plurality of grain passages larger in cross section than said first passages extending longitudinally along said element between said first passages and said discharge portion to permit larger grains and partially separated grains to pass therethrough;
   (b) auger means rotatably mounted within each of said elements to propel the grain to be separated therethrough;
   (c) means for rotatably driving said augers.
3. The structure set forth in claim 2 wherein said separating elements are rotatably mounted and means for driving said elements in counterrotation with respect to said augers.
4. The structure set forth in claim 2 wherein the diameter of said auger is substantially less than the diameter of said separating elements and said augers are mounted for rotation on the longitudinal axis of said elements.
5. Apparatus for final separation of grains, in combination with a combine including:
   (a) a partially separated grain receiving section arranged within the combine to receive grain therein and extending transversely across the combine;
   (b) a plurality of substantially cylindrical separating elements arranged in side-by-side parallel relation and in position to receive grain from said receiving section; each having:
       (1) a conveying passage through the longitudinal length thereof from the receiving portion to a discharge portion;
       (2) a first plurality of grain passages through the periphery thereof extending longitudinally along said elements adjacent the receiving portion thereof;
       (3) a second plurality of grain passages larger in cross section than said first passages extending longitudinally along said element between said first passages and said discharge portion to permit larger grains and partially separated grains and partially separated grains to pass therethrough;
(c) auger means rotatably mounted within each of said separating elements to propel the grain to be separated therethrough, each auger extending into said grain receiving portion to facilitate delivery of such grain to said element; and
(d) means for rotatably driving said augers.

6. The structure set forth in claim 5 wherein said grain receiving section includes a plurality of U-shaped auger housing sections arranged in side-by-side parallel relation in respective alignment with said separating elements, the U-shaped portions preventing the grain from sliding to one side of the separating apparatus.

7. The structure set forth in claim 5 wherein the portions of the augers within the grain receiving portion are of a first diameter and the portions within the separating elements are smaller than said first diameter and smaller than said separating elements.

8. The structure set forth in claim 5 wherein said separating elements are rotatably mounted and means for driving said elements in counterrotation with respect to said augers.

9. The structure set forth in claim 5 and means for adjusting the size of said first and second grain passages in accordance with the size of a particular grain particle being separated.

10. The structure set forth in claim 5 and a second pair of substantially cylindrical separating elements respectively receivable about each of said separating elements having:
(a) a plurality of grain passages therethrough corresponding in size and location to said first and second grain passages to permit registration of said openings in one position to provide an effective grain passage of one size; and
(b) means to permit shifting of said members to shift the registration of said openings to alter the effective size of the grain passage.

References Cited

UNITED STATES PATENTS

| 560,586 | 5/1896 | Koch | 130—27.17 X |
| 1,674,142 | 6/1928 | Strang | 209—296 |
| 1,879,960 | 9/1932 | Thoen | 56—20 |
| 3,126,893 | 3/1964 | Palmer | 130—27 |

FRANK W. LUTTER, *Primary Examiner.*

HARRY B. THORNTON, *Examiner.*

T. R. MILES, L. H. EATHERTON, *Assistant Examiners.*